Sept. 3, 1940.  J. MIHALYI  2,213,742
AUTOMATIC DIAPHRAGM CONTROL FOR PHOTOGRAPHIC CAMERAS
Filed July 26, 1939
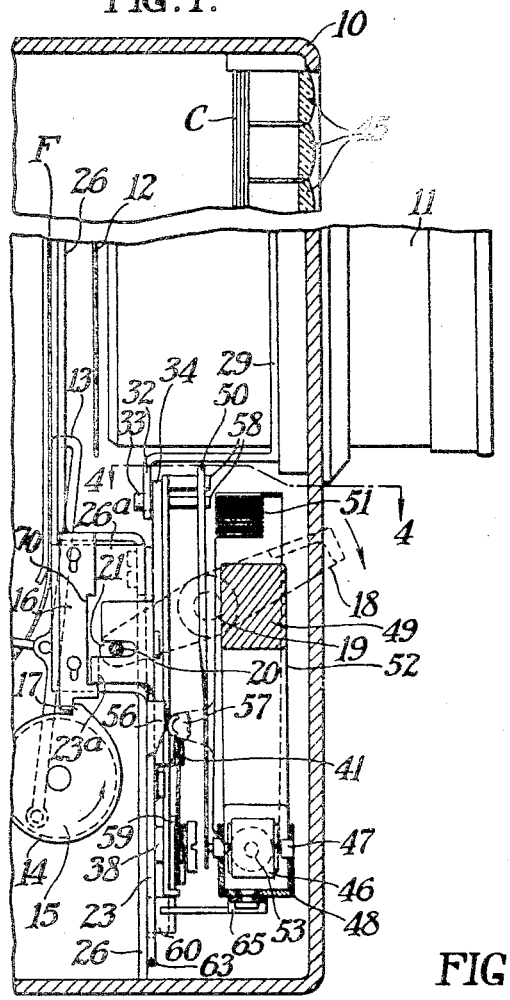
JOSEPH MIHALYI
INVENTOR
BY
ATTORNEYS Patented Sept. 3, 1940

2,213,742

UNITED STATES PATENT OFFICE 2,213,742

AUTOMATIC DIAPHRAGM CONTROL FOR PHOTOGRAPHIC CAMERAS

Joseph Mihalyi, Rochester, N. Y., assignor to Eastman Kodak Company, Rochester, N. Y., a corporation of New Jersey Application July 26, 1939, Serial No. 286,677

5 Claims. (Cl. 95—64)

This invention relates to automatic diaphragm control mechanisms for photographic cameras, and particularly to a structure wherein a light-sensitive cell is activated by light reflected from the subject confronting the camera in accordance with the scene brightness, the energy thus generated being caused to actuate an electric meter.

One object of the invention is to provide means whereby a cell actuated meter may be so coupled to a camera lens diaphragm that the latter will be set automatically at the opening or f/value which is correct for the existing conditions at the time of making the exposure, without further thought or attention of the operator. Another object is to provide manually-operable connections whereby the diaphragm regulator or automatic aperture-control mechanism may be rendered ineffective when the light value is too low for a normal exposure, but the operator wishes to make an attempt at a photograph nevertheless. A further object is to arrange the elements of the invention so that the whole is applicable to either ordinary cameras or to motion-picture apparatus. Other objects will appear in the following specifications which may be understood by reference to the accompanying drawing in which:

Fig. 1 is a fragmentary elevation-section of the front portion of a motion-picture camera embodying the present invention;

Fig. 2 is a front elevation of the mechanism of Fig. 1, the camera body being broken away and the diaphragm being in wide open or normal position;

Fig. 3 is a fragmentary elevation similar to Fig. 2, but with the diaphragm partially closed;

Fig. 4 is a top plan in section, showing some of the parts of Fig. 1; and

Fig. 5 is a fragmentary elevation of a portion of Fig. 2, showing the manually-operable connections above mentioned, as set to circumvent the automatic device.

The drawing illustrates a preferred form of the invention as incorporated in a common type of motion-picture camera having a body 10, a lens system 11, and a shutter 12 operating in suitable timed relation to a pull-down claw or intermittent feed member 13 that advances the film F in the usual manner, the pull-down being shown as actuated by an eccentric or crank disc 14. A stop member 15 is provided for bringing the operating parts to rest always in a given position (with the shutter closed) and this stop may be on the same shaft as discs 14. An intercepting slide bar 16 is provided to engage a tooth 17 on the stop member 15. The usual operating or release lever 18, pivoted at 19, has a pin 20 projecting into a slot 21 in a lug 23a. The lever 18 is forced by a spring 22 in a direction opposite to the arrow in Fig. 1, so that unless the operator depresses the forward end of the lever the slide bar 16 will engage the tooth 17 as indicated, and the operating parts of the camera will be held against movement.

The intercepting slide bar 16 is movable up and down on a fixed lug 26a, which is part of a partition or gate plate 26 extending across the camera. A flat plate member 23, hereinafter referred to as the control member, is slotted at 24 to engage guide pins 25 set in plate 26, so that the member 23 may move up and down on said pins, against the front face of partition 26. The lug 23a is bent rearwardly from member 23 and it is in this lug that slot 21 is located for engagement with pin 20. Thus when lever 18 is depressed against the resistance of spring 22 to release the shutter and the camera mechanism, pin 20 moves control member 23 upwardly, and when said lever is released, spring 22 will return lever 18 to normal and cause the control member to slide downwardly where it will stop in the position of Fig. 2 where the upper ends of slots 24 strike pins 25.

The diaphragm for the camera lens (Figs. 2 and 3) may consist of an appropriate number of blades 27, pivoted at 28 in a fixed part of the lens mount, the blades being proximate to a ring 29 that is circumferentially movable. Pins 30 in ring 29 engage slots 31 in the blades 27, the latter being so designed that movement of the ring counter-clockwise will change the diaphragm aperture from wide open to extremely contracted, this movement being in a series of decreasing steps between successive f/apertures. A forked arm 32 projects from the ring 29 and engages a pin 33 in an oscillating member 34 which is pivoted at 35 on the partition 26. Member 34 has an elongated curved cam slot 36 whereby its degree of oscillation about the pivot 35, and therefore the diaphragm aperture, are controlled through means about to be described.

In my Patent #2,058,483 the diaphragm aperture is varied by the straight-line movement of a sliding plate, and the distance this plate moves is substantially equal between any two successive f/values. In the circular or ring-operated leaf-type diaphragm illustrated herewith, the actuating member 34 must move the ring 29 a greater distance to effect a change in the diaphragm from an aperture of f/1.9 to f/2.7, for instance, than the movement required between f/8 and f/16.

In front of cam member 34 is a lever 37, hereinafter designated as the follower, and pivoted on a stud 38 in the plate 26. A pin 39 projects rearwardly from the lower end of lever 37 and under a part 40 of control member 23 that is bridged over the stud 38. The spring 22, being comparatively strong, constantly tends to force control member 23 downwardly, and in so doing, causes the portion 40 to press against pin 39 and to swing follower 37 to the extreme right (Fig. 2) against the action of another and weaker spring 41. The free end of the latter is attached to a pin 42 on lever 37, and its other end is anchored on the lowermost guide pin 25.

When finger lever 18 is depressed to start the camera mechanism, the control member 23 is carried upwardly, and the action of spring 41 against pin 42 turns the lever 27 counterclockwise (Fig. 2) about the stud 38, the pin 39 constantly pressing the end 40 upwardly. The engagement with the slot 36 of a pin 43 on the free end of follower 37 causes the cam to rotate clockwise and to reduce the diaphragm aperture.

All of the foregoing has been designed to coact with an automatic diaphragm-aperture limiting device, the position of which is governed by a light-sensitive cell responsive to the brightness of the subject toward which the camera is directed. In the present illustrated form of the invention a light-sensitive cell C, mounted in the front of the camera is adapted to receive light-impressions through a series of simple lens elements 45, and the micro-current generated in the cell is conducted to an armature 46, carried by pintles 47 in a frame 48. A permanent magnet 49 also supported in the frame 48 is so arranged that the armature, located between the poles of the magnet, is biased in one direction by the magnetic field and is urged toward one extreme position by a spring, not shown, in a manner well known in light-measuring instruments. The pintles 47 are in the present structure concentric with the stud 38 but are not connected thereto.

Affixed to one of the pintles 47 is a meter pointer 50. When the light received by the cell C is weak the pointer will stand at the extreme right end of its arc (as viewed from the front) and when the light is most intense the pointer will be swung to the extreme left as in Fig. 2. With light of the intensity range usual for taking photographs the pointer may be at any location between these extremes. To make use of the above conditions for limiting the diaphragm opening to the required f/value, a pointer trapping member is employed, similar in operation to that shown in my U. S. Patent 2,058,483. In the present instance the trapping member comprises an arch-like "comb" 51, the side arms 52 of which are pivoted at 53 in suitable brackets 54, so that the comb tends to move backwardly or toward the camera under the pressure of a spring 55 to trap the meter pointer 50 between the teeth of the comb, whereby the pointer is held against movement to right or left. Normally, however, the comb is held clear of the pointer by a forwardly-projecting lug 56 (Fig. 1) on control member 23, which is aligned with a bracket 57 on one arm of the comb, so that the latter may move into engagement with the pointer 50 only when control member 23 is moved upwardly by the release lever 18.

The light reflected from the subject activates the cell C and the meter pointer 50 swings to the left accordingly. When the operator depresses the release lever 18 it must be depressed to its limit before the camera will start, because (Fig. 1) the slide bar 16 will not be lifted from the tooth 17 to release the stop 15 until the lug 23a has moved upwardly a considerable distance, or nearly the full length of slots 24, and has traversed the full length of a cut-out portion 70 on the front edge of the slide bar 16. As soon as control member 23 moves upwardly the lug 56 moves out of the path of bracket 57 and the spring 55 presses the comb 51 rearwardly and traps pointer 50 so that it cannot move to right or left. Simultaneously, the lever 37 turns counterclockwise about the stud 38 under pressure of spring 41 and swings the cam 34, which contracts the diaphragm. The pin 39 maintains contact with the lower edge of control member 23, and the follower lever 37 continues to move to the left until two lugs 58 on its upper end above and below the comb 51 strike the trapped pointer 50 and stop against it. The lever 37 then cannot move any further (Fig. 3). If at this point the slide bar 16 has not been lifted free from the tooth 17, the camera mechanism will not start, so the operator must depress lever 18 until it does. The spring 41 under this condition acts as a resilient connection between the release lever 18 and the mechanical connections to the diaphragm. The spring 41 is capable of so acting even if the pointer 50 is trapped close to the right side of the comb.

The response of the meter element to equal successive increments of light intensity is not uniform, but, in common with most devices of this character, has such an action that the pointer 50 moves larger and larger distances as the light value is stepped up by equal increments. Between the position of the pointer which would indicate a required aperture of f/1.9 and that which would indicate f/2.7 the pointer will move very slightly, while between f/8 and f/16 the pointer will move a much greater distance. This rate of movement is just the opposite of that of the diaphragm.

In order, therefore, that the diaphragm aperture may be established in accordance with the position of the meter element pointer 50, the cam slot 36 is formed as shown, to compensate for the different rates of movement of the diaphragm and the meter element.

There is a limit below which the member 37 should be inoperative, and that limit must be consistent with the speed of the lens in the camera and the exposure interval available. Means are provided for blocking the mechanism if the light value is below the limit of lens capacity for a correct exposure, unless the operator actually wishes to risk an exposure regardless of the deficient illumination of the scene.

Near the lower end of cam operator 37 is a detent 59, pivoted on the stud 38, and having a rearwardly-projecting lug 60 at its lower end. A spring 61 tends to turn detent 59 clockwise, so that lug 60 strikes a projection 62 on member 37. If control member 23 is in its lowermost position as in Fig. 2, and lever 37 is also at its extreme right hand limit of movement as shown, the lug 60 lies directly in the path of a hook 63 on the lower end of member 23. If the meter pointer 50 at this time is so located that the lever 37 may move ever so slightly as member 23 begins its upward movement, the lever 59 will move with lever 37 and the lug 60 will just clear the hook 63. Control member 23 will then move its entire travel upwardly as lever 18 is depressed, the spring 41 functioning as a resilient connection or driver for lever 37 and the camera will operate, with the diaphragm substantially at full opening, the pointer 50 having been trapped at nearly its extreme right position.

If the light falling on the cell C is too feeble to cause the pointer to move from its very extreme right position, the hook 63 immediately encounters the lug 60 and the operator then cannot depress release lever 18, and the camera mechanism will not operate. When this occurs, if the operator still wishes to take a chance on an exposure knowing the subject is not adequately illuminated, he may push inwardly on a button 64, at the outer end of a slide bar 65. The inner end of the latter normally rests against the lug 60 (Figs. 1 and 2) but when the button 64 is pushed inwardly the slide bar 65 forces the detent 59 counter clockwise against the pressure of spring 61 and permits the hook 63 to pass the lug 60, whereupon the lever 18 may be fully depressed to operate the camera. When the lever 18 returns to normal under the influence of spring 22, and control member 23 moves to the lower limit, the hook 63 pushes against the top of lug 60 and snaps past the latter, unless the operator is still pressing the button 64, in which case control member 23 will be restored to normal position without interference.

As previously mentioned this invention may be applied to hand or view cameras, by modifying the design so that control member 23 is coupled to the shutter release lever. Such a modification may be adapted by anyone skilled in the art, and it is thought that specific illustration herein is unnecessary.

I claim:

1. In a photographic camera, an iris diaphragm movable by a blade ring and requiring a shorter movement of said ring for each consecutive smaller f/aperture, a light-actuated meter element which moves a greater distance for each successive equal increment of light intensity, and means for translating any position of the meter element into a corresponding diaphragm aperture comprising a spring-actuated follower engageable with the meter element, means for locking the meter element to stop the follower when the latter has contacted the meter element, and a cam member connected with the follower and with the blade ring and so arranged that movement of the follower causes the cam member to move the diaphragm to an aperture corresponding with the position of the meter element.

2. In a photographic camera, an iris diaphragm in which the blade ring moves a shorter distance to form each consecutive smaller f/aperture, a light-actuated meter element in which successive equal light increments cause a greater movement of the meter for each succeeding increment, and means whereby the meter element may govern the diaphragm aperture comprising means for locking the meter element, a spring-actuated follower movable in the path of the meter element and adapted to be stopped thereby, an oscillating member connected with the blade ring, and a cam portion on the oscillating member cooperating with the follower and so formed that as the follower approaches the meter element the oscillating member moves the blade ring to produce a diaphragm aperture in accordance with the meter position.

3. In a photographic camera, an iris diaphragm in which the movement of the blades from each f/aperture to the next smaller aperture requires successively shorter movements of a blade-ring, a diaphragm operating member connected with the blade ring, a spring-actuated lever connected with the diaphragm operating member, a light-actuated meter element which moves successively greater amounts for additional equal light increments, means for locking the meter element and releasing the lever to permit the latter to stop against the meter element, and a cam portion on the diaphragm operating member so formed that as the lever is stopped by the meter element a diaphragm aperture is established which is correct for the existing light intensity.

4. In a photographic camera, an iris diaphragm having a blade-ring which requires unequal steps of movement to produce successive f/apertures in the diaphragm, a light-actuated meter element which moves in successively longer steps for each equal increase in light intensity, mechanism between the blade-ring and the meter element for limiting the diaphragm aperture in accordance with the position of the meter element comprising a follower adapted to be stopped by the meter element, and an oscillating member having a pivotal connection with the blade-ring and a cam connection with the follower, said cam connection having a contour which will cause the follower to swing the oscillating member and thereby move the blade-ring to establish a diaphragm aperture in accordance with the position of the meter element.

5. In a photographic camera, an iris diaphragm having a blade ring which is movable in unequal steps to consecutively double or halve the f/value of the diaphragm aperture, a light-actuated meter element which moves an increasing distance for each equal additional light increment, means for locking the meter element after it has come to rest when directed to a scene, a manually-controlled spring-actuated follower adapted to move toward the meter element and to be stopped thereby, an oscillating cam member pivoted on the camera and having a pivotal connection with the blade ring, said cam member cooperating with the follower and being of such contour that as the follower approaches the meter element the blade ring is moved by the cam member in accordance with the position of said meter element and thereby establishes a diaphragm aperture in accordance with the position of the meter element.

JOSEPH MIHALYI.